(12) United States Patent
Kuroiwa

(10) Patent No.: US 9,483,234 B2
(45) Date of Patent: Nov. 1, 2016

(54) REQUIREMENTS CONTRADICTION DETECTION SYSTEM, REQUIREMENTS CONTRADICTION DETECTION METHOD, AND REQUIREMENTS CONTRADICTION DETECTION PROGRAM

(71) Applicant: NEC Corporation, Minato-ku, Tokyo (JP)

(72) Inventor: Yukiko Kuroiwa, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 14/652,592

(22) PCT Filed: Nov. 11, 2013

(86) PCT No.: PCT/JP2013/080966
§ 371 (c)(1),
(2) Date: Jun. 16, 2015

(87) PCT Pub. No.: WO2014/097790
PCT Pub. Date: Jun. 26, 2014

(65) Prior Publication Data
US 2016/0188297 A1    Jun. 30, 2016

(30) Foreign Application Priority Data

Dec. 18, 2012 (JP) ................................. 2012-275745

(51) Int. Cl.
*G06F 9/44* (2006.01)

(52) U.S. Cl.
CPC .. *G06F 8/10* (2013.01); *G06F 8/73* (2013.01)

(58) Field of Classification Search
CPC .................................... G06F 8/10; G06F 8/73
USPC .......................................................... 717/123
See application file for complete search history.

(56) References Cited

U.S. PATENT DOCUMENTS

| 6,047,300 A | * | 4/2000 | Walfish ................. G06F 17/273 715/257 |
| 7,925,605 B1 | * | 4/2011 | Rubin ................... G06N 5/025 706/47 |

(Continued)

FOREIGN PATENT DOCUMENTS

| JP | 2008-250760 A | 10/2008 |
| JP | 2009-116648 A | 5/2009 |
| JP | 4351186 B2 | 10/2009 |

OTHER PUBLICATIONS

International Search Report for PCT Application No. PCT/JP2013/080966, mailed on Apr. 2, 2014.

(Continued)

*Primary Examiner* — Lewis A Bullock, Jr.
*Assistant Examiner* — Theodore Hebert

(57) ABSTRACT

To determine a contradiction between requirements and specifications in a specification document for system/software development without labor for preparation in advance, provided is a requirements contradiction detection system, including: a relevancy detection part for detecting, for two requirements expressed in texts, a relevancy between the two requirements based on a similarity between one requirement acquired by converting one of the texts based on a predetermined contradiction rule and another requirement that is not converted; and a contradiction detection part for detecting whether or not the two requirements contradict each other based on a detection result of the relevancy detection part, the similarity calculated by the relevancy detection part, and a similarity between the two original requirements before conversion.

8 Claims, 6 Drawing Sheets

(56) References Cited

U.S. PATENT DOCUMENTS

| | | | | |
|---|---|---|---|---|
| 2002/0016798 A1* | 2/2002 | Sakai | ............... | G06F 17/2755 715/234 |
| 2009/0226872 A1* | 9/2009 | Gunther | ............... | G09B 7/00 434/350 |
| 2010/0242023 A1* | 9/2010 | Han | ............... | G06F 21/12 717/124 |
| 2011/0029467 A1* | 2/2011 | Spehr | ............... | G06Q 30/02 706/13 |
| 2013/0138428 A1* | 5/2013 | Chandramouli | ...... | G06F 17/274 704/9 |
| 2013/0151957 A1* | 6/2013 | Kuroiwa | ............... | G06F 17/2211 715/256 |
| 2014/0052728 A1* | 2/2014 | Nakazawa | ........ | G06F 17/30598 707/737 |

OTHER PUBLICATIONS

A. Egyed, P. Grunbacher, "Identifying Requirements Conflicts and Co-operation," 2004 IEEE Software, vol. 21, No. 6, pp. 50-58.

English translation of relevant part of written opinion for PCT/JP2013/080966.

* cited by examiner

| NUMBER | REQUIREMENT TEXT |
|---|---|
| 1 | REGISTER DATA A. (データAを登録。) |
| 2 | REGISTRATION OF DATA A IS NOT CARRIED OUT. (データAの登録は、これをしない。) |

| NUMBER | REQUIREMENT TEXT |
|---|---|
| 1 | DATA B IS EDITABLE. (データBは編集可能。) |
| 2 | B DATA. READ ONLY. (Bデータ。読込のみ。) |

| NUMBER | CONTENTS OF CONTRADICTION RULE | SECOND EXPRESSION OF CONTRADICTION RULE |
|---|---|---|
| 1 | <SAHEN-NOUN> | <SAHEN-NOUN>.*しない |
| 2 | READ ONLY | EDITABLE |

| NUMBER | REQUIREMENT TEXT |
|---|---|
| 1 | DATA B IS READ ONLY. (データBは読込のみ。) |
| 2 | DATA A IS EDITABLE AND DATA B IS READ ONLY. (データAは編集可能でデータBは読込のみ。) |

| NUMBER | DIVISION PATTERN | ANTECEDENT PART | CONSEQUENT PART |
|---|---|---|---|
| 1 | ^(.*)<TAIL UNNECESSARY WORD> 場合 <HEAD UNNECESSARY WORD>(.*)$ <br>(which means "IF(.*),(.*)$") | $1 | $2 |
| 2 | ^(.*)<TAIL UNNECESSARY WORD> とき <HEAD UNNECESSARY WORD>(.*)$ <br>(which means "WHEN(.*),(.*)$") | $1 | $2 |

| NUMBER | REQUIREMENT TEXT |
|---|---|
| 1 | WHEN A BUTTON IS DEPRESSED, DELETE REGISTERED DATA A.<br>(Aボタンを押下のとき、登録したデータAを削除。) |
| 2 | IF BUTTON A IS PRESSED, DATA A IS NOT DELETED.<br>(ボタンAを押した場合にはデータAを削除しない。) |

FIG. 9

| NUMBER | ANTECEDENT PART | CONSEQUENT PART | ANTECEDENT PART AFTER CONVERSION | CONSEQUENT PART AFTER CONVERSION |
|---|---|---|---|---|
| 1 | A BUTTON IS DEPRESSED | DELETE REGISTERED DATA A. | A BUTTON IS DEPRESSED | DELETE DATA A. |
| 2 | BUTTON A IS PRESSED | DATA A IS NOT DELETED. | BUTTON A IS PRESSED | DATA A IS NOT DELETED. |

FIG. 10

| NUMBER | NUMBER OF CONTRADICTION RULE | FIRST EXPRESSION | SECOND EXPRESSION |
|---|---|---|---|
| 1 | 1 | <SAHEN-NOUN OTHER THAN MATCH><br>し[た な][い]* (meaning "do" and "do not" or "is" and "is not" etc.) | |
| 2 | 2 | READ ONLY PROHIBITED | |

FIG. 11

| NUMBER | REQUIREMENT TEXT |
|---|---|
| 1 | WHEN A BUTTON IS DEPRESSED, DELETE REGISTERED DATA A.<br>(Aボタンを押下のとき、登録したデータAを削除。) |
| 2 | IF BUTTON A IS PRESSED, DATA A IS DELETED BUT NOT REGISTERED.<br>(ボタンAを押した場合にはデータAを削除するが登録しない。) |

FIG. 12

| NUMBER | ANTECEDENT PART | CONSEQUENT PART | ANTECEDENT PART AFTER CONVERSION | CONSEQUENT PART AFTER CONVERSION |
|---|---|---|---|---|
| 1 | A BUTTON IS DEPRESSED | DELETE REGISTERED DATA A. | A BUTTON IS DEPRESSED | DELETE DATA A. |
| 2 | BUTTON A IS PRESSED | DATA A IS DELETED BUT NOT REGISTERED. | BUTTON A IS PRESSED | DATA A IS DELETED BUT. |

FIG. 13

REQUIREMENTS CONTRADICTION DETECTION SYSTEM, REQUIREMENTS CONTRADICTION DETECTION METHOD, AND REQUIREMENTS CONTRADICTION DETECTION PROGRAM

This application is a National Stage Entry of PCT/JP2013/080966 filed on Nov. 11, 2013, which claims priority from Japanese Patent Application 2012-275745 filed on Dec. 18, 2012, the contents of all of which are incorporated herein by reference, in their entirety.

TECHNICAL FIELD

This invention relates to a requirements contradiction detection system, method, and program for determining a contradiction between requirements in a specification document for system/software development.

BACKGROUND ART

A specification document in system/software development has been confirmed for a state free from contradictions by means of a manual review. However, there is such a problem in that inspection of a document in a large quantity including redundant descriptions requires cost (time and labor), and oversights may occur during the manual inspection.

In Patent Literature 1, there is disclosed a method of detecting a contradiction in a specification document. In Patent Literature 1, conditions (preconditions, postconditions, and invariants) relating to validity of information on a specification document are set based on a use case, an arbitrary operation is extracted from an event flow, conditions (preconditions and postconditions) relating to the extracted operation are set, and whether or not the set conditions are satisfied is determined by using the conditions relating to the operation. However, in Patent Literature 1, it is assumed that the specification document is strictly set as conditions for the use case, and there is such a problem in that labor for preparation before analysis is required in advance for each specification document.

In Non Patent Literature 1, there is disclosed a method of identifying a conflict between requirements. According to Non Patent Literature 1, a requirement is manually classified into attributes, and it is estimated that the relationship of the conflict exists between requirements in a dependent relationship between predetermined attributes. However, in Non Patent Literature 1, the dependent relationship between requirements or a relationship between a requirement and an executable code is necessary, and these relationships need to be prepared in advance. Therefore, there is such a problem in that labor for preparation before analysis is required in advance for each specification document.

PRIOR ART LITERATURE

Patent Literature

Patent Literature 1: JP-B-4351186

Non Patent Literature

Non Patent Literature 1: A. Egyed, P. Grunbacher, "Identifying Requirements Conflicts and Co-operation," 2004 IEEE Software, Vol. 21, No. 6, pp. 50-58.

DISCLOSURE OF THE INVENTION

Problems to be Solved by the Invention

This invention has been made in view of the above-mentioned problems, and therefore has an object to provide a system, method, and program for determining a contradiction between requirements and between specifications in a specification document for system/software development.

An object of the requirements contradiction detection system according to one embodiment of this invention is to determine a contradiction between requirements and specifications in a specification document for system/software development without labor for preparation in advance.

Means to Solve the Problem

According to one embodiment of this invention, there is provided a requirements contradiction detection system, including: a relevancy detection part for detecting, for two requirements expressed in texts, a relevancy between the two requirements based on a similarity between one requirement acquired by converting one of the texts based on a predetermined contradiction rule and another requirement that is not converted; and a contradiction detection part for detecting whether or not the two requirements contradict each other based on a detection result of the relevancy detection part, the similarity calculated by the relevancy detection part, and a similarity between the two original requirements before conversion.

Effect of the Invention

According to the one embodiment of this invention, the contradiction between requirements and specifications may be determined in a specification document for system/software development without labor for preparation in advance. It should be noted that, in this invention, the contradiction rules are prepared, but the contradiction rules do not need to be prepared for each specification document, and may be shared in the system/software development. Therefore, according to the one embodiment of this invention, the labor is not registered for the preparation in advance for each specification document.

BRIEF DESCRIPTION OF THE DRAWING

FIG. 9 is an explanatory diagram showing an example of the requirements contradicting each other stored in the requirement storage part 100.

FIG. 10 is an explanatory diagram showing an example of requirement information stored in a requirement information storage part 201.

FIG. 11 is an explanatory diagram showing an example of prior conversion rules stored in a prior conversion rule storage part 202.

FIG. 12 is an explanatory diagram showing an example of other requirements stored in the requirement storage part 100.

FIG. 13 is an explanatory diagram showing an example of other requirement information stored in the requirement information storage part 201.

MODES FOR EMBODYING THE INVENTION

First Embodiment

A detailed description is now given of a requirements contradiction detection system according to a first embodiment of this invention with reference to the drawings. The requirements contradiction detection system according to the first embodiment verifies, for two requirements, whether the two requirements have a relevancy when a contradiction between parts in a contradiction relevancy is resolved, and, when the two requirements have a relevancy, detects whether or not an actual contradiction exists. The contradiction between the parts in the contradiction relevancy is resolved by using contradiction rules, which include a plurality of contradiction expressions in the contradiction relevancy, and converting one of the requirements. Whether or not the actual contradiction exists is detected by comparing a similarity between the original requirements in the contradiction relevancy with a similarity between the requirements for which the contradiction is resolved. It should be noted that the contradiction means an illogical state in which, in a case where a certain phenomenon can take a plurality of states, but does not simultaneously take states different from each other, the phenomenon is said to be in a certain state, while the phenomenon is said to be in another state. For example, in a case where the certain phenomenon is in any one of the two states, which are affirmative and negative states, when the certain phenomenon is affirmative on one side and negative on another side, this situation is a contradiction. Moreover, in a case where a file A is in any one of a read only state or an editable state, when the file A is in the read only state on one side and the editable state on another side, this situation is a contradiction.

Figures 1, 2, 3, 4:
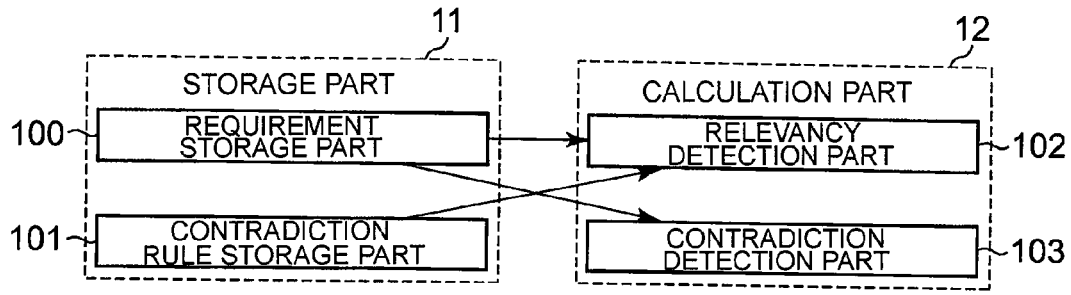
FIG. 1 is a block diagram illustrating a configuration example of a requirements contradiction detection system according to a first embodiment of this invention.
FIG. 2 is an explanatory diagram showing an example of requirements contradicting each other stored in a requirement storage part 100.
FIG. 3 is an explanatory diagram showing another example of the requirements contradicting each other stored in the requirement storage part 100.
FIG. 4 is an explanatory diagram showing an example of contradiction rules stored in a contradiction rule storage part 101.

Referring to FIG. 1, the requirements contradiction detection system according to this embodiment includes a storage part 11 for storing information and a calculation part 12 operated by means of program control.

The storage part 11 includes a requirement storage part 100 and a contradiction rule storage part 101.

The requirement storage part 100 stores two requirements. The two requirements may be specified by an input of a user of the system via a keyboard or the like, may be stored in the system as a default, or may be specified in other forms. The requirement is extracted from a document subject to the contradiction detection. The document is, for example, a request for proposal (RFP), which is a document used to request a proposal to an IT vendor, which is a supplier, when a public office or a private company, which is a buyer, procures an information system or an IT service. The RFP is also referred to as request for procurement, request for bidding, demand for proposal, requisition for proposal, requirement for proposal, offer for proposal, request for quotation, request for proposal submission, bidding description, contract specification document, and the like. Moreover, the document is, for example, a proposal, which is a document in which the IT vendor describes specific proposed items. The proposal is also referred to as project document, project proposal, and the like. Moreover, the document is, for example, a specification document describing required items, which are items to be satisfied by a system or a service. The specification document is also referred to as requirement specification document, requirement definition document, functional specification document, design document, contract document, and the like. On this occasion, the requirement according to this invention includes a specification in these specification documents. These documents include tables other than a body. Thus, a requirement expressed by a text includes not only a sentence constructed by a subject, a predicate, and an object, but also includes parts of a sentence such as a list of terms. FIG. 2 is an explanatory diagram showing an example of requirements contradicting each other stored in the requirement storage part 100. FIG. 3 is an explanatory diagram showing another example of the requirements contradicting each other stored in the requirement storage part 100. In these diagrams, a first row is a title row for columns, and each of second and later rows represents one requirement. A number in a first column is a number representing a requirement. A requirement text in a second column is a text representing a content of the requirement. In the following, a requirement numbered by i is referred to as requirement i. A requirement 2 in FIG. 3 is an example of extraction from a table of a document. It should be noted that a description is given of processing of determining whether or not the two requirements in the requirement storage part 100 contradict each other, but three or more requirements may be stored in the requirement storage part 100, and whether or not each two of the stored requirements contradict each other may be determined. Moreover, synonyms in requirements extracted from a document may be unified to a representative word by using a dictionary or the like, thereby simplifying the redundant expressions thereof. For example, when "read only", "読み込みのみ", "読込みのみ", and "読込のみ" (which all mean "read only" in English) are described in requirements, these terms may be unified to the term, "読込のみ" (which means "read only" in English), by using a synonym dictionary, and then may be stored in the requirement storage part 100. The synonym dictionary may be manually generated, or, for example, WordNet exists as a common synonym dictionary. The terms may be manually unified by using a synonym dictionary, or may be automatically converted by a computer or the like.

The contradiction rule storage part 101 stores contradiction rules, which are rules for determining a contradiction. The contradiction rule is constructed by a plurality of contradiction expressions representing a plurality of states that are not satisfied at the same time, and each of the contradiction expressions is a string or an expression (regular expression) representing one or more strings in one string. The contradiction rule may be specified by an input of the user of the system via a keyboard or the like, may be stored in the system as a default, or may be specified in other forms. FIG. 4 is an explanatory diagram showing an example of the contradiction rules stored in the contradiction rule storage part 101. In this diagram, a first row is a title row for columns, and each of second and later rows represents one contradiction rule. A number in a first column is a number representing a contradiction rule. A first expression of the contradiction rule in a second column and a second expression of the contradiction rule in a third column are respectively contradiction expressions. In the following, a contradiction rule numbered by k is referred to as contradiction rule k. In the first expression and the second expression of a contradiction rule, <sahen-noun> is an expression representing an arbitrary sahen-noun (i.e., a noun that can be turned into a verb by affixing a Japanese verb "suru" (meaning "do") at the end), and ".*" is an expression representing an arbitrary string. It should be noted that a string matching the second expression <sahen-noun> is specified to be the same as a string matching the first expression <sahen-noun>. Moreover, on this occasion, a description is given of, as an example, a case in which the contradiction rule stored in the contradiction rule storage part 101 includes two contradiction expressions, but the contradiction rule may include three or more contradiction expressions.

The calculation part 12 includes a relevancy detection part 102 and a contradiction detection part 103.

The relevancy detection part 102 converts the text of one of the two requirements stored in the requirement storage part 100 based on the contradiction rules stored in the contradiction rule storage part 101, and detects a relevancy between the two requirements based on a similarity between a text after the conversion and the other remaining requirement text. The conversion of a requirement text based on a contradiction rule is, for example, a conversion of a string that is included in the requirement, and matches one contradiction expression out of the two contradiction expressions of the contradiction rule into a string matching the other contradiction expression of the contradiction rule. The string matching the contradiction expression is, for example, a string, "登録" (which means "register"), "削除" (which means "delete"), or the like, which matches a contradiction expression, "<sahen-noun>", which is the first expression of the contradiction rule 1 of FIG. 4. On this occasion, when the string after the conversion includes the expression ".*" representing an arbitrary string such as "登録.*しない" (which means "register.*do not"), the relevancy detection part 102 deletes the expression, ".*", representing an arbitrary string (or considers the arbitrary string matches a string, " ", which is a string of 0 in the length), and sets "登録しない" (which means "do not register") as the string after the conversion. For example, when the requirement 1 of FIG. 2 is converted based on the contradiction rule 1 of FIG. 4, the relevancy detection part 102 converts the sahen-noun, "登録", of the requirement 1 into "登録しない". Thus, the relevancy detection part 102 converts the requirement 1, "データAを登録。" (which means "register data A.") into "データAを登録しない。" (which means "do not register data A."). It should be noted that the fact that "登録" is a sahen-noun can be detected by using a morphological analysis engine, for example. As the morphological analysis engine for Japanese, for example, MeCab and ChaSen exist. When a text is input, MeCab or ChaSen delimits the text into words, and outputs, when the word is a sahen-noun, "noun, verbal", for example. Alternatively, even without using the morphological engine such as MeCab and ChaSen, the storage part may store words each representing a sahen-noun in a row, and the relevancy detection part 102 may search the storage part, thereby determining whether or not there is a sahen-noun. The relevancy detection part 102 can approximate the similarity between a converted requirement i and a non-converted requirement j based on, for example, approximation of the Kolmogorov complexity. When the relevancy detection part 102 assumes that the two requirements contradict each other, and this contradiction is resolved by converting one of the requirements, the relevancy detection part 102 verifies whether or not a similarity as high as such a degree that the two requirements are considered to be consistent with each other exists. It is also conceivable that whether or not a contradiction exists between texts in a natural language can be determined by verifying whether or not subjects, predicates, objects, and the like respectively match each other by means of a technology of the syntax analysis, and verifying, when they match each other, these texts are respectively an affirmative expression and a negative expression. However, in order to mechanically interpret that "The user depresses a registration button." "Depression of a registration button is carried out by the user." are the same in meaning in a specification document, various types of syntax information representing the same meaning need to be prepared in advance. Moreover, there are sentences such as "depress a registration button" and "display on a screen", in which subjects are omitted, in a specification document. The reason for this is that the human can easily interpret that the subject of "depress a registration button" is "user", and the subject of "display on a screen" is "system" in a limited case of the specification document. In order to mechanically interpret that the subjects are the same, such knowledge that the subject of "depressing" is "user" needs to be prepared in advance. However, knowledge specific to an industry, a type of business, and a customer is used in the specification document, and it is thus practically impossible to prepare all the knowledge in advance. Further, when parts of a sentence extracted from a drawing and the like are included in a requirement in the specification document, the interpretation of the parts of the sentence is not always unique, and it is almost impossible to prepare all the interpretations in advance. Therefore, the similarity is used to determine consistency according to this invention.

The contradiction detection part 103 detects a contradiction between two requirements detected as having a relevancy by the relevancy detection part 102 based on the similarity after the conversion calculated by the relevancy detection part 102 and the similarity between the requirements stored in the requirement storage part 100. A result of the detection may be immediately output via a display device and a printing device, may be stored and then output depending on a request of the user of the system, or may be output in other forms. It should be noted that when there are strings contradicting each other, the relevancy detection part 102 assumes that a contradiction exists, and verifies whether or not the requirements are consistent with each other when the contradiction is resolved, but even if there are strings contradicting each other, a contradiction may not exist. The contradiction detection part 103 verifies whether a case in which a contradiction is resolved is considered to be more consistent than the case in which the contradiction is not resolved based on the similarity. It should be noted that if a contradiction rule includes three or more contradiction expressions, this invention may be applied while the contradiction expressions are considered as a combination of pairs of contradiction expressions. Alternatively, if the contradiction rule includes three or more contradiction expressions, only a case in which one requirement matches only one contradiction expression out of the contradiction expressions of a contradiction rule, and the other requirement matches another one of the contradiction expressions of the contradiction rule may be set to a subject of this invention. A method of application to the case including three or more contradiction expressions may be specified by an input of the user of the system via a keyboard or the like, may be stored in the system as a default, or may be specified in other ways.

Figure 5:
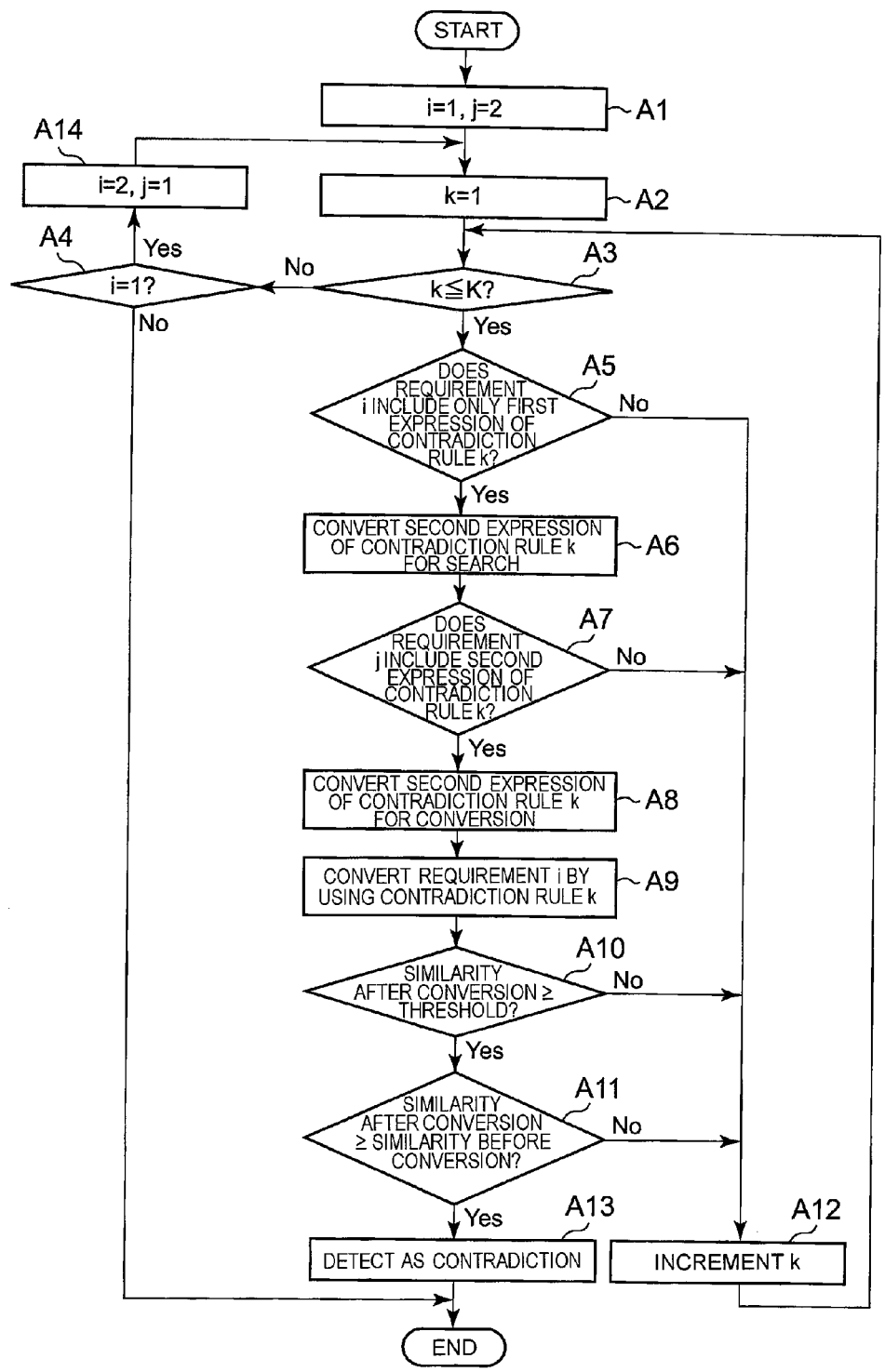
FIG. 5 is a flowchart illustrating an example of a processing sequence of the requirements contradiction detection system according to the first embodiment of this invention.

Referring to a flowchart of FIG. 5, a detailed description is now given of an overall operation of the first embodiment.

First, the relevancy detection part 102 initializes i representing the number of the first requirement to 1, and initializes j representing the number of the second requirement to 2 out of the requirements stored in the requirement storage part 100 (Step A1).

Then, the relevancy detection part 102 initializes k representing the number of the contradiction rule stored in the contradiction rule storage part 101 to 1 (Step A2).

Then, the relevancy detection part 102 compares k and K representing the number of the contradiction rules stored in the contradiction rule storage part 101 (Step A3). When k is equal to or less than K representing the number of the contradiction rules stored in the contradiction rule storage part 101, the relevancy detection part 102 controls the processing to proceed to Step A5. When k is more than K, the relevancy detection part 102 controls the processing to proceed to Step A4.

The relevancy detection part 102 compares i and 1 with each other (Step A4). When i and 1 are equal to each other, the relevancy detection part 102 controls the processing to proceed to Step A14. When i is not equal to 1, the relevancy detection part 102 finishes the operation. On this occasion, when i is not equal to 1, the relevancy detection part 102 may output such a state that a contradiction is not detected. The state may be immediately output via a display device and a printing device, may be stored and then output depending on a request of the user of the system, or may be output in other forms.

The relevancy detection part 102 verifies whether or not the requirement i stored in the requirement storage part 100 includes the first expression of the contradiction rule k stored in the contradiction rule storage part 101 (Step A5). On this occasion, a state in which the requirement i includes only the first expression of the contradiction rule k means that the text of the requirement i includes only the first expression of the contradiction rule k, but does not include the second expression of the contradiction rule k. When the requirement i includes only the first expression of the contradiction rule k, the relevancy detection part 102 controls the processing to proceed to Step A6. Otherwise, the relevancy detection part 102 controls the processing to proceed to Step A12. A description is now given of a case of the two requirements of FIG. 2, and the two contradiction rules of FIG. 4 as an example. When i=1, j=2, and k=1, the requirement 1, "データAを登録。" (which means "register data A."), includes "登 録" (which means "register") as the first expression, "<sahen-noun>", of the contradiction rule 1, and does not include the second expression, "<sahen-noun>.*しない" (which read as "<sahen-noun>.*SHINAI" and means "<sahen-noun>.*do not"), of the contradiction rule 1. The relevancy detection part 102 thus controls the processing to proceed to Step A6. A description is now given of a case in which the two requirements are those of FIG. 3 in place of those of FIG. 2 as an example. When i=1, j=2, and k=1, the requirement 1, "データBは編集 可能。" (which means "data B is editable."), includes "編集" (which means "edit") as the first expression, "<sahen-noun>", of the contradiction rule 1, but does not include the second expression, "<sahen-noun>.*しない", of the contradiction rule 1. The relevancy detection part 102 thus controls the processing to proceed to Step A6. When i=1, j=2, and k=2, the requirement 1, "データBは編集可能。", does not include the first expression, "読込のみ" (which means "read only"), of the contradiction rule 2, and the relevancy detection part 102 thus controls the processing to proceed to Step A12. When i=2, j=1, and k=1, the requirement 2, "B データ。読込のみ。" (which means "B data. read only."), includes "読込" (which means "read only") as the first expression, "<sahen-noun>", of the contradiction rule 1, but does not include the second expression, "<sahen-noun>.*しない", of the contradiction rule 1. The relevancy detection part 102 thus controls the processing to proceed to Step A6. When i=2, j=1, and k=2, the requirement 2, "B データ。読込のみ。", includes the first expression, "読込のみ" (which means "read only"), of the contradiction rule 2, but does not include the second expression, "編 集可能" (which means "editable."), of the contradiction rule 2. The relevancy detection part 102 thus controls the processing to proceed to Step A6.

Then, the relevancy detection part 102 converts an expression matching a plurality of strings of the second expression of the contradiction rule k stored in the contradiction rule storage part 101 into a string of the first expression matching in the previous step (Step A6). It should be noted that when the second expression is one string, nothing is carried out in this step. Moreover, even when a conversion is carried out, the converted contradiction rule is not stored in the contradiction rule storage part 101. A description is now given of the case of the two requirements of FIG. 2, and the two contradiction rules of FIG. 4 as an example. When i=1, j=2, and k=1, the processing reaches this step, and the requirement 1 includes "登録" as the first expression, "<sahen-noun>", of the contradiction rule 1 in the previous step. Thus, the relevancy detection part 102 converts "<sahen-noun>" of the second expression, "<sahen-noun>.*しない", of the contradiction rule 1 into "登録". Thus, the relevancy detection part 102 converts the second expression, "<sahen-noun>.*しない", of the contradiction rule 1 into "登録.*しない". A description is now given of the case in which the two requirements are those of FIG. 3 in place of those of FIG. 2 as an example. When i=1, j=2, and k=1, the processing reaches this step, and the relevancy detection part 102 converts the second expression, "<sahen-noun>.*しない" of the contradiction rule 1 to "登録.*しない" (which means "edit.* do not"). When i=2, j=1, and k=1, the processing also reaches this step, and the relevancy detection part 102 converts the second expression, "<sahen-noun>.*しない" of the contradiction rule 1 to "読込.*しない". When i=2, j=1, and k=2, the processing also reaches this step, and the relevancy detection part 102 does not convert the second expression, "編集可能" of the contradiction rule 2, and keeps the second expression as "編集可能".

Then, the relevancy detection part 102 verifies whether or not the requirement j stored in the requirement storage part 100 includes the second expression of the contradiction rule k (Step A7). On this occasion, when the second expression of the contradiction rule k is converted in the previous step, the converted second expression is used. When the requirement j includes only the second expression of the contradiction rule k, the relevancy detection part 102 controls the processing to proceed to Step A8. Otherwise, the relevancy detection part 102 controls the processing to proceed to Step A12. For example, in the case of the two requirements of FIG. 2, and the two contradiction rules of FIG. 4, when i=1, j=2, and k=1, the processing reaches this step, and the requirement 2, "データAの登録は、これをしない。" (which means "registration of data A is not carried out"), includes the second expression, "登 録.*しない" (which means "registration.*is not"), of the contradiction rule 1. Thus, the relevancy detection part 102 controls the processing to proceed to Step A8. A description is now given of the case in which the two requirements are those of FIG. 3 in place of those of FIG. 2 as an example. When i=1, j=2, and k=1, the processing reaches this step, and the requirement 2, "Bデータ。読込のみ。" (which means "B data. read only."), does not include the second expression, "編集.*しない" (which means "edit.*do not"), of the contradiction rule 1. The relevancy detection part 102 thus controls the processing to proceed to Step A12. When i=2, j=1, and k=1, the processing reaches this step, and the requirement 1, "データBは編集可能。" (which means "data B is editable."), does not include the second expression, "読込.*しない" (which means "read.*do not"), of the contradiction rule 1. Thus, the relevancy detection part 102 controls the processing to proceed to Step A12. When i=2, j=1, and k=2, the processing reaches this step, and the requirement 1, "データBは編集可能。", includes the second expression, "編集可能" (which means "editable"), of the contradiction rule 2. Thus, the relevancy detection part 102 controls the processing to proceed to Step A8.

Then, the relevancy detection part 102 converts the second expression of the contradiction rule k into an expression for the conversion (Step A8). On this occasion, the relevancy detection part 102 converts the expression matching a plurality of strings of the second expression of the contradiction rule k converted in Step A6 into the one shortest string. For example, the relevancy detection part 102 converts "登録.*しない" (which means "register.*do not") into "登録しない" (which means "do not edit"), converts "編集.*しない" (which means "edit.*do not") into "編集しない" (which means "do not edit"), and converts "読込.*しない" (which means "read.*do not") into "読込しない" (which means "do not read"). It should be noted that the relevancy detection part 102 does not rewrite the contradiction rule k in the contradiction rule storage part 101.

Then, the relevancy detection part 102 uses the contradiction rule k converted in Step A8 so as to convert the requirement i stored in the requirement storage part 100 (Step A9). The conversion of a requirement is to convert the first expression of the contradiction rule k included in the requirement i into the second expression of the contradiction rule k. It should be noted that the relevancy detection part 102 does not rewrite the requirement storage part 100. In other words, the conversion result of the requirement i is not stored in the requirement storage part 100. In the case of the two requirements of FIG. 2, and the two contradiction rules of FIG. 4, when i=1, j=2, and k=1, the processing reaches this step, and the relevancy detection part 102 converts the requirement 1, "データAを登録。" (which means "register data A."), into "データAを登録し ない。" (which means "do not register data A."). In the case in which the two requirements are those of FIG. 3 in place of those of FIG. 2, when i=2, j=1, and k=2, the processing reaches this step, and the relevancy detection part 102 converts the requirement 1, "Bデータ。読込のみ。" (which means "B data. read only."), into "Bデータ。編集可能。" (which means "B data. editable.").

Then, the relevancy detection part 102 calculates the similarity (similarity after the conversion) between the converted requirement i and the non-converted requirement j as the similarity after the conversion, and compares the calculated similarity and a predetermined threshold with each other (Step A10). When the similarity is equal to or more than the threshold, the relevancy detection part 102 controls the processing to proceed to Step A11 of the contradiction detection part 103. When the similarity is less than the threshold, the relevancy detection part 102 controls the processing to proceed to Step A12. Moreover, when the similarity is equal to or more than the threshold, the relevancy detection part 102 detects that the requirement i and the requirement j relate with each other. The similarity may be calculated, for example, by means of the approximation of the Kolmogorov complexity. Regarding the approximation of the Kolmogorov complexity, if an algorithm for compressing a text is defined in advance, a similarity s(i,j) between a text i and a text j can be calculated by an equation represented by $d(i,j)=1-C(ij)/\{C(i)+C(j)\}$ or $d(i,j)=1-[C(ij)-\min\{C(i),C(j)\}]/\max\{C(i),C(j)\}$, where $C(i)$ is a size of a compressed text i, $C(j)$ is a size of a compressed text j, and $C(ij)$ is a size of a compressed text of a concatenation of the text i and text j. The compression algorithm to be specified is, for example, zip, gzip, or the like. The compression algorithm, for example, encodes a string into a pair of (matching length, matching position) with a symbol, which is a character, or a previous partial string. In the encoding, numbers of symbols appearing strings are acquired, and a shorter code is assigned to a symbol appearing more frequently. If the approximation of the Kolmogorov complexity is used for the calculation of the similarity, the similarity takes a value from 0 to 1. In this case, such a value as 0.5, 0.45, or 0.4 can be used as the predetermined threshold. Moreover, the similarity can be calculated by the number of words or an appearance frequency of a word common to the two requirements. The calculation method for the similarity may be specified by an input of the user of the system via a keyboard or the like, may be stored in the system as a default, or may be specified in other forms. A description is now given of the processing in this step for the case of the two requirements of FIG. 2, and the two contradiction rules of FIG. 4 as an example. When i=1, j=2, and k=1, as described before, the requirement 1 after the conversion is "データAを登録しない。" (which means "do not register data A."), and this requirement 1 after the conversion is similar to the requirement 2, "データAの登録は、これをしない。" (which means "registration of data A is not carried out."). Therefore, the similarity between the requirement 1 after the conversion and the requirement 2 without the conversion is equal to or more than the predetermined threshold. Thus, the relevancy detection part 102 detects the presence of the relevancy, and controls the processing to proceed to Step A11 of the contradiction detection part 103. Moreover, when i=2, j=1, and k=2 in FIG. 2 in place of FIG. 3, the requirement 2 after the conversion, "Bデータ。編集可能。" (which means "B data. editable."), and the requirement 1 without the conversion, "データBは編集可能。" (which means "data B is editable."), are similar to each other. Therefore, the similarity is equal to or more than the threshold. The relevancy detection part 102 thus detects the presence of the relevancy, and controls the processing to proceed to Step A11 of the contradiction detection part 103. It should be noted that a description is here given of the method of comparing the similarity after the conversion and the predetermined threshold with each other, but when many requirements are stored in the requirement storage part 100, the relevancy detection part 102 may estimate the threshold from a distribution of many similarities after the conversion, or the like. Alternatively, the user of the system may determine the threshold by considering the distribution of the many similarities after the conversion.

Figures 6, 7, 8:
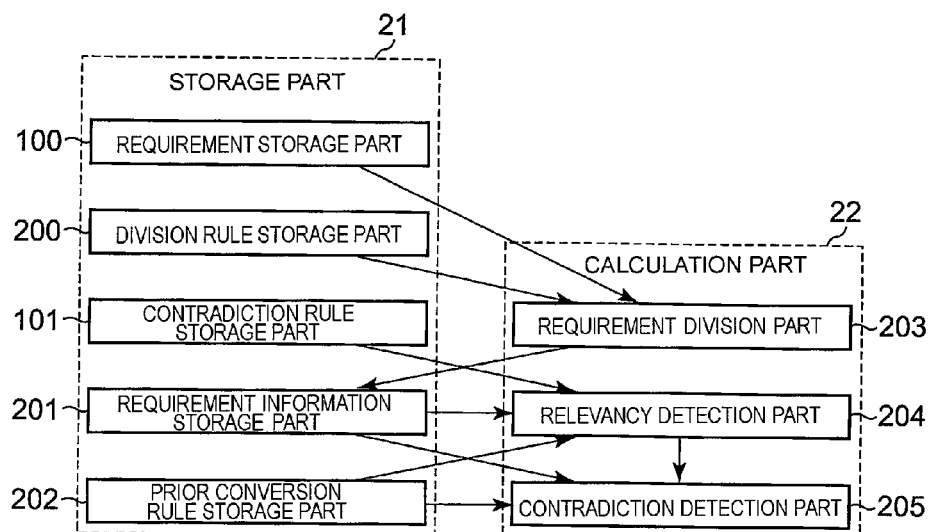
FIG. 6 is an explanatory diagram showing an example of requirements not contradicting each other stored in the requirement storage part 100.
FIG. 7 is a block diagram illustrating a configuration example of a requirements contradiction detection system according to a second embodiment of this invention.
FIG. 8 is an explanatory diagram showing an example of division rules stored in a division rule storage part 200.

Then, the contradiction detection part 103 calculates the similarity (similarity before the conversion) between the requirement i and the requirement j stored in the requirement storage part 100, and compares the similarity after the conversion calculated by the relevancy detection part 102 and the similarity before the conversion (Step A11). When the similarity after the conversion is equal to or more than the similarity before the conversion, the contradiction detection part 103 controls the processing to proceed to Step A13. When the similarity after the conversion is less than the similarity before the conversion, the contradiction detection part 103 controls the processing to proceed to Step A12 of the relevancy detection part 102. For example, when i=1, j=2, and k=1 in FIGS. 2 and 4, the similarity between the converted requirement 1, "データAを登録しない。" (which means "do not register data A."), and the requirement 2 without the conversion, "データAの登録は、これをしない。" (which means "registration of data A is not carried out"), is high, and the similarity between the requirement 1 without the conversion, "データAを登録。" (which means "register data A."), and the requirement 2 without the conversion, "データAの登録は、これをしない。", is low. Thus, the contradiction detection part 103 controls the processing to proceed to Step A13. When i=2, j=1, and k=2 in FIGS. 3 and 4, the similarity between the converted requirement 2, "Bデータ。編集可能。" (which means "B data. editable."), and the requirement 1 without the conversion, "データBは編集可能。" (which means "data B is editable."), is higher than the similarity between the requirement 2 without the conversion, "Bデータ。読込のみ。" (which means "B data. read only.") and the requirement 1 without the conversion. Thus, the contradiction detection part 103 controls the processing to proceed to Step A13. A description is now given of a case requiring not only the relevancy detection part 102 but also the contradiction detection part 103. FIG. 6 is an explanatory diagram showing an example of requirements not contradicting each other stored in the requirement storage part 100. A description is now given of a case of the two requirements of FIG. 6, and the two contradiction rules of FIG. 4 as an example. Regarding the two requirements of FIG. 6, when i=1, j=2, and k=1, in Step A5, the requirement 1, "データBは読込のみ。" (which means "data B is read only."), includes "読込" (which means "read") as the first expression, "<sahen-noun>", of the contradiction rule 1, but does not include the second expression, "<sahen-noun>.*しない", of the contradiction rule 1. Thus, the relevancy detection part 102 controls the processing to proceed to Step A6, and converts the second expression of the contradiction rule 1 into "読込.*しない" (which means "read.*do not"). Then, the relevancy detection part 102 controls the processing to proceed to Step A7. The requirement 2, "データAは編集可能でデータBは読込のみ。" (which means "data A is editable and data B is read only."), does not include the second expression, "読込.*しない" (which means "read.*do not"), of the contradiction rule 1, and hence the processing does not reach this step. When i=1, j=2, and k=2, in Step A5, the requirement 1, "データBは読込のみ。" (which means "data B is read only."), includes the first expression, "読込のみ" (which means "read only"), of the contradiction rule 2, but does not include the second expression, "編集可能" (which means "editable"), of the contradiction rule 2. Thus, the relevancy detection part 102 controls the processing to proceed to Step A6, and keeps the second expression of the contradiction rule 2 as "編集可能". Then, the relevancy detection part 102 controls the processing to proceed to Step A7. The requirement 2, "データAは編集可能でデータBは読込のみ。", includes the second expression, "編集可能", of the contradiction rule 2, and the relevancy detection part 102 thus controls the processing to proceed to Step A8. Then, in Step A8, the relevancy detection part 102 keeps the second expression of the second rule 2 as "編集可能", and controls the processing to proceed to Step A9. Then, in Step A9, the relevancy detection part 102 converts the requirement 1, "データBは読込のみ。", into "データBは編集可能。" (which means "data B is editable."). Then, in Step A10, the relevancy detection part 102 calculates the similarity between the requirement 1 after the conversion, "データBは編集可能。", and the requirement 2 without the conversion, "データAは編集可能でデータBは読込のみ。". The requirement 1 after the conversion and the requirement 2 without the conversion are similar to each other, and the similarity is thus equal to or more than the threshold. If this step does not exist, a contradiction is detected. However, when the processing reaches this step of the contradiction detection part 103, the similarity between the requirement 1 before the conversion and the requirement 2 without the conversion is calculated. On this occasion, the requirement 1 after the conversion, "ータBは読込のみ。", and the requirement 2 without the conversion, "データAは編集可能でデータBは読込のみ。", match each other in "データ は編集可能データBは", and "。". On the other hand, the requirement 1 before the conversion, "データBは読込のみ。", and the requirement 2 without the conversion, "データ A は編集可能でデータBは読込のみ。" match each other in "データBは読込のみ。", "データ", and "は". If the approximation of the Kolmogorov complexity is used, the similarity increases as the matching length between strings increases. Thus, the similarity between the requirement 1 before the conversion and the requirement 2 without the conversion that match each other in a longer string, "データBは読込のみ。", is high. Thus, in this step, the similarity after the conversion is less than the similarity before the conversion. Thus, the contradiction detection part 103 does not detect the contradiction, and controls the processing to transition. When i=2, j=1, and k=1, in Step A5, the requirement 2, "データAは編集可能でータBは読込のみ。", includes "編集" or "読込" as the first expression, "<sahen-noun>", of the contradiction rule 1, but does not include the second expression, "<sahen-noun>*しない", of the contradiction rule 1. The relevancy detection part 102 thus controls the processing to proceed to Step A6. In Step A6, when the matching in the previous step is "編集", the relevancy detection part 102 converts the second expression, "<sahen-noun>.*しない", of the contradiction rule 1 into "編集.*しない", and when the matching in the previous step is "読込", the relevancy detection part 102 converts the second expression, "<sahen-noun>.*しない", of the contradiction rule 1 into "読込.*しない". Then, the relevancy detection part 102 controls the processing to proceed to Step A8, converts the second expression of the contradiction rule 1 into "編集しない" or "読込しない", and controls the processing to proceed to Step A7. Then, in Step A7, the requirement 1 does not include the second expression, "編集.*しない" or "読 込.*しない" of the contradiction rule 1, and the processing does not thus reach this step. When i=2, j=1, and k=2, in Step A5, the requirement 2, "データAは編集可能で データBは読込のみ。", includes the first expression, "読込のみ", of the contradiction rule 2, and also includes the second expression, "編集可能", of the contradiction rule 1. Thus, the processing does not reach this step. In this way, in this step of the contradiction detection part 103, the two requirements in FIG. 6 can be avoided from being detected as a contradiction.

Then, the relevancy detection part 102 increments k (Step A12). Then, the relevancy detection part 102 controls the processing to proceed to Step A3.

The contradiction detection part 103 detects the two requirements as a contradiction (Step A13). A result of the detection may be immediately output via a display device and a printing device, may be stored and then output depending on a request of the user of the system, or may be output in other forms. Then, the contradiction detection part 103 finishes the processing.

The relevancy detection part 102 changes i to 2, and j to 1 (Step A14). Then, the processing proceeds to Step A2. In other words, processing in which the requirement 1 and requirement 2 are switched is started.

According to this embodiment, a contradiction between requirements in a specification document for system/software development can be determined without the labor for preparation in advance. The contradiction rules prepared in this invention need to be prepared not for each specification document, but only for the entire system/software development, and hence the labor for preparation in advance is not required for each specification document according to this invention. It should be noted that a description is given of the case in which one requirement includes one sahen-noun for the sake of description, but when a plurality of sahen-nouns are included in one requirement, the contradiction may be verified similarly by repeatedly using the relevancy detection part and the contradiction detection part for the respective sahen-nouns, and even when one sahen-noun causing a contradiction is detected, the contradiction may be determined to exist.

Second Embodiment

A detailed description is now given of a requirements contradiction detection system according to a second embodiment of this invention with reference to the drawings. Like components as of the first embodiment are denoted by like numerals, and a detailed description thereof is therefore omitted.

Referring to FIG. 7, the requirements contradiction detection system according to this embodiment includes a storage part 21 for storing information and a calculation part 22 operated by means of program control.

The storage part 21 includes the requirement storage part 100, a division rule storage part 200, the contradiction rule storage part 101, a requirement information storage part 201, and a prior conversion rule storage part 202.

The requirement storage part 100 is the same as that of the first embodiment.

The division rule storage part 200 stores division rules for dividing a requirement into an antecedent part and a consequent part. The division rule may be specified by an input of the user of the system via a keyboard or the like, may be stored in the system as a default, or may be specified in other forms. FIG. 8 is an explanatory diagram showing an example of the division rules stored in the division rule storage part 200. In this diagram, a first row is a title row for columns, and each of second and later rows represents one division rule. A number in a first column is a number representing a division rule. A division pattern in a second column represents a pattern expression of the division rule. In the following, a division rule numbered by i is referred to as division rule i. In the division pattern of the diagram, "^" is an expression representing a head, and "$" is an expression representing a tail. "<Head unnecessary word>" is an unnecessary word as a head of a sentence, such as "、" and "には". "<Tail unnecessary word>" is an unnecessary word as a tail of a sentence, such as "の". "( )" represents that when a part matching an enclosed part is counted from the left, the first match can be referred to by "$1", and the second match can be referred to by "$2". A third column of the diagram represents which match is referred to as the antecedent part. A fourth column of the diagram represents which match is referred to as the consequent part. In this example, "$1", which is the first match, is referred to as the antecedent part, and "$2", which is the second match, is referred to as the consequent part.

The contradiction rule storage part 101 is the same as that of the first embodiment.

The requirement information storage part 201 stores requirement information that is information on the requirements stored in the requirement storage part 100. FIG. 9 is an explanatory diagram showing an example of requirements contradicting each other stored in the requirement storage part 100. FIG. 10 is an explanatory diagram showing an example of the requirement information stored in the requirement information storage part 201. For the requirements of FIG. 9, each piece of the requirement information of FIG. 10 stores the antecedent part and the consequent part of each of the requirements. In FIG. 10, a first row is a title row for columns, and each of second and later rows represents one piece of the requirement information. A number in a first column is a number representing one piece of requirement information. An antecedent part in a second column represents the antecedent part of the requirement, and a consequent part in a third column represents the consequent part of the requirement. An antecedent part after a conversion in a fourth column represents an antecedent part after a conversion based on a prior conversion rule described in the prior conversion rule storage part 202, and an consequent part after a conversion in a fifth column represents a consequent part after a conversion based on a prior conversion rule described in the prior conversion rule storage part 202.

In the following, requirement information numbered by i is referred to as requirement information i. Moreover, requirement information on a requirement i in the requirement storage part 100 is referred to as requirement information i in the requirement information storage part 201. The requirement information storage part 201 is empty when the processing starts, and the requirement information is stored as the processing according to this invention progresses.

The prior conversion rule storage part 202 stores the prior conversion rules for converting a text before the similarity is calculated. The prior conversion rule may be specified by an input of the user of the system via a keyboard or the like, may be stored in the system as a default, or may be specified in other forms. FIG. 11 is an explanatory diagram showing an example of the prior conversion rules stored in the prior conversion rule storage part 202. In this diagram, a first row is a title row for columns, and each of second and later rows represents one prior conversion rule. A number in a first column represents a number of a prior conversion rule. A number of a contradiction rule in a second column represents a number of a contradiction rule constituting a prerequisite for applying this prior conversion rule. The prior conversion rule is constructed by two expressions, a first expression in a third column and a second expression in a fourth column, which respectively represent expressions before and after the conversion by the prior conversion rule. In the following, a prior conversion rule numbered by m is referred to as prior conversion rule m. In FIG. 11, the number of the contradiction rule of a prior conversion rule 1 is "1", and the prior conversion rule 1 is thus applied to a case where the contradiction rule 1 of FIG. 4 is used for the conversion. The contradiction rule 1 is used for matching with <sahen-noun>, and "<sahen-noun other than match>" means another sahen-noun different from the matching sahen-noun. In FIG. 11, the number of the contradiction rule of a prior conversion rule 2 is "2", and the prior conversion rule is thus applied to a case where the contradiction rule 2 of FIG. 4 is used for the conversion. It should be noted that a description is here given of a case where the second expression of the prior conversion rule is null (string having a length 0) as an example, but the second expression of the prior conversion rule can be what is not null.

The calculation part 22 includes a requirement division part 203, a relevancy detection part 204, and a contradiction detection part 205.

The requirement division part 203 divides the requirement stored in the requirement storage part 100 into the antecedent part and the consequent part based on the division rules stored in the division rule storage part 200, and stores the result of the division in the requirement information storage part 201. A description is now given of the case of FIGS. 8 and 9 as an example. A division pattern, "^(*)<tail unnecessary word>場合 (.*)$" (which means "If(.*), (.*)$"), of the division rule 1 of FIG. 8 does not match the requirement 1, "Aボタンを押下とき登録した" (which means "when A button is depressed, delete registered data A."), of FIG. 9, and a division pattern, "^(*)<tail unnecessary word>とき(.*)$" (which means "When(.*), (.*)$"), of the division rule 2 matches the requirement 1. Thus, the requirement division part 203 determines that "Aボタンを押下" (which means "A button is depressed") before "の"+"とき"+", ", namely "のとき、", is the antecedent part, and " 登録した " after "のとき、" is the consequent part based on the division rule 2. Moreover, the er or not the twodivision pattern of the division rule 1 of FIG. 8 matches requirement 2, "データAを削除。場合にはボタン を押した" of FIG. 9. Thus, the requirement division part 203 determines that "データAを削除。", before "場合"+"に は ", namely "場合には ", is the antecedent part, and " ボタンを押した " after "場合には " is the consequent part based on the division rule 1. Then, the requirement division part 203 stores the requirement information in the requirement information storage part 201 as the requirement information 1 of FIG. 10.

The relevancy detection part 204 converts the antecedent part and the consequent part of the requirement stored in the requirement information storage part 201 based on the contradiction rules stored in the contradiction rule storage part 101, and stores a conversion result in the requirement information storage part 201. Then, the relevancy between the two requirements is detected based on the requirement information stored in the requirement information storage part 201. The operation of unifying synonyms in a requirement extracted from a document to a representative word by using dictionaries and the like, thereby simplifying the redundant expressions is carried out as in the description of the requirement storage part 100 of the first embodiment. The prior conversion herein is a prior conversion carried out for each contradiction rule to be applied. For example, for one contradiction rule stored in the contradiction rule storage part 101, the relevancy detection part 204 converts a string of the requirement information matching the first expression of the prior conversion rule into a string matching the second expression of the prior conversion rule. A description is now given of a case in which the requirement information of FIG. 10 is converted based on the prior conversion rules of FIG. 11. When the requirement information 1 of FIG. 10 is converted by using the contradiction rule 1 of FIG. 4, the antecedent part, "Aボタンを押下" (which means "A button is depressed"), of the requirement information 1 does not match the first expression of any of the prior conversion rules of FIG. 11, and the relevancy detection part 204 thus does not convert the antecedent part, and directly stores the antecedent part, "Aボタンを押下", of the requirement information 1 in the antecedent part after the conversion of FIG. 10. The consequent part, "登 録したデータAを削除。" (which means "delete registered data A."), of the requirement information 1 matches the first expression of the prior conversion rule 1, and the relevancy detection part 204 thus deletes " 登録した " (which means "registered"), sets, as shown in FIG. 10, the consequent part after the conversion to "データAを削除。" (which means "delete data A."), and stores it in the consequent part after the conversion of FIG. 10.

The contradiction detection part 205 detects a contradiction based on the similarity calculated by the relevancy detection part 204 and the similarity between the consequent parts of the requirement information stored in the requirement information. On this occasion, the consequent parts of the requirement information only needs to be used in place of the requirements of the first embodiment.

Figure 14:
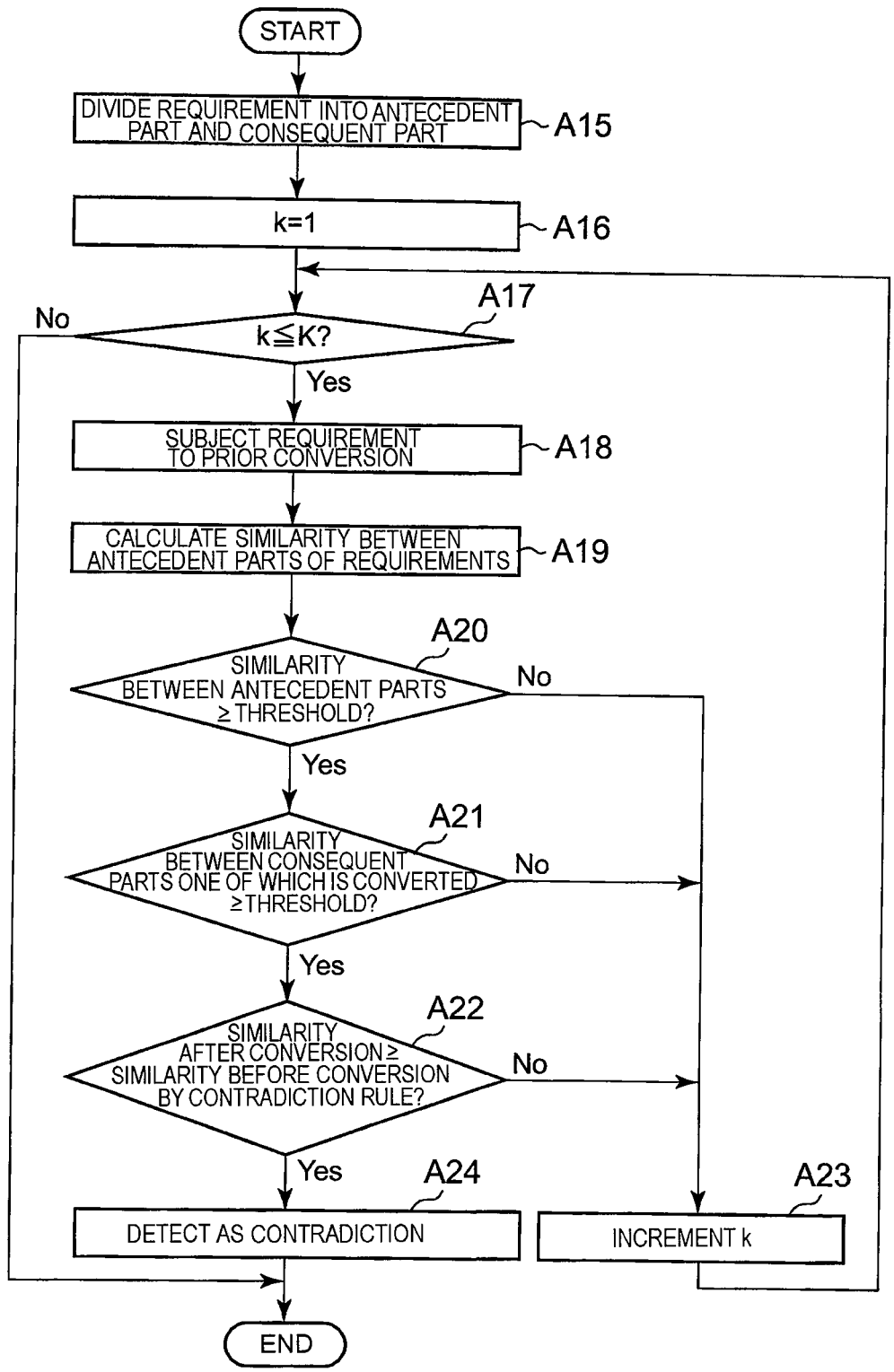
FIG. 14 is a flowchart illustrating an example of a processing sequence of the requirements contradiction detection system according to the second embodiment of this invention.

Referring to a flowchart of FIG. 14, a detailed description is now given of an overall operation of the second embodiment.

First, the requirement division part 203 divides each of the two requirements stored in the requirement storage part 100 into the antecedent part and the consequent part based on the division rules stored in the division rule storage part 200 (Step A15). Then, the requirement division part 203 stores the texts of the antecedent parts and the texts of the consequent parts in the requirement information storage part 201. Detailed processing of this step is described later.

Then, the relevancy detection part 204 initializes k representing the number of the contradiction rule stored in the contradiction rule storage part 101 to 1 (Step A16).

Then, the relevancy detection part 204 compares k and K representing the number of the contradiction rules stored in the contradiction rule storage part 101 (Step A17). When k is equal to or less than K representing the number of the contradiction rules stored in the contradiction rule storage part 101, the relevancy detection part 204 controls the processing to proceed to Step A18. When k is more than K, the relevancy detection part 204 determines that the two requirements do not contradict each other, and finishes the processing. On this occasion, when k is more than K, the relevancy detection part 204 may provide such an output representing the state in which a contradiction does not exist. The state may be immediately output via a display device and a printing device, may be stored and then output depending on a request of the user of the system, or may be output in other forms.

Then, the relevancy detection part 204 converts the two requirements based on the contradiction rule k and the prior conversion rules stored in the prior conversion rule storage part 202 (Step A18).

Then, the relevancy detection part 204 calculates the similarity between the antecedent parts of the two requirements (Step A19). On this occasion, when both the antecedent parts of the two requirements are null (strings having a length 0), the similarity of the antecedent parts of the two requirements is set to a value more than a threshold of a next step. In other words, when neither of the two requirements have the antecedent parts, the relevancy detection part 204 determines that the antecedent parts are similar to each other in the next step. When one of the antecedent parts of the two requirements is null, the similarity is approximately 0 based on the approximation of the Kolmogorov complexity. In other words, when only one of the two requirements has the antecedent part, the relevancy detection part 204 determines that the antecedent parts are not similar to each other in the next step.

Then, the relevancy detection part 204 compares the calculated similarity between the antecedent parts and the threshold with each other (Step A20). The threshold may be specified by an input of the user of the system via a keyboard or the like, may be stored in the system as a default, or may be specified in other forms. When the similarity is equal to or more than the threshold, the relevancy detection part 204 controls the processing to proceed to Step A21. When the similarity is less than the threshold, the relevancy detection part 204 controls the processing to proceed to Step A23. In other words, the relevancy detection part 204 verifies whether or not a contradiction exists only when the antecedent parts are similar to each other.

Then, the relevancy detection part 204 compares the similarity between the consequent parts one of which is converted by using the contradiction rules and a threshold with each other (Step A21). The threshold may be specified by an input of the user of the system via a keyboard or the like, may be stored in the system as a default, or may be specified in other forms. It should be noted that the same value as that of Step A20 may be used, or a different value may be specified as the threshold of this step. The conversion by using the contradiction rules is the same processing as that of the first embodiment. When the similarity between the consequent parts one of which is converted for one certain contradiction rule is equal to or more than the threshold, the relevancy detection part 204 controls the processing to proceed to Step A22. When the similarity is less than the threshold, the relevancy detection part 204 controls the processing to proceed to Step A23. In order to present a difference from the first embodiment, a description is given of another example of the conversion using the prior conversion rules. FIG. 12 is an explanatory diagram showing an example of other requirements stored in the requirement storage part 100. FIG. 13 is an explanatory diagram showing an example of other requirement information stored in the requirement information storage part 201. For the requirements of FIG. 12, each piece of the requirement information of FIG. 13 stores the antecedent part and the consequent part of each of the requirements. As shown, the two requirements do not contradict each other. The antecedent parts of the two requirements are similar to each other, and the consequent part, "登録したデータ A を削除。" (which means "delete registered data A."), of the requirement information 1 matches "削除" (which means "delete"), which is a sahen-noun, but does not match "削除.*しない" (which means "delete.*do not"). The consequent part, "データAを削除するが登録しない。" (which means "data A is deleted but not registered."), of the requirement information 2 matches "削除.*しない". When the processing of the first embodiment is carried out while the consequent part of the requirement information is considered as a requirement, the consequent part of the requirement information 1 is converted into "登録したデータ A を削除しない。" (which means "do not delete registered data A.") by using the contradiction rule 1 of FIG. 4. Then, the consequent part of the converted requirement information 1 and the consequent part of the requirement information 2 without the conversion are similar to each other, and presence of the relevancy is thus detected. On the other hand, according to the second embodiment, when "削除" is used as <sahen-noun> of the contradiction rule 1 of FIG. 4, "登録" is a sahen-noun other than "削除" based on the prior conversion rule 1 of FIG. 11, and hence the relevancy detection part 204 deletes "登録しない" from the consequent part, "データAを削除するが登録しない。" (which means "data A is deleted but not registered."), of the requirement information 2, resulting in "データAを削除するが。" (which means "data A is deleted but") as the consequent part after the conversion of the requirement information 1 of FIG. 13. Therefore, as shown in FIG. 13, the consequent part, "データAを削除。" (which means "delete data A."), of the requirement information 1 and the consequent part, "データAを削除するが。" (which means "date A is deleted but"), of the requirement information 2 do not match the contradiction rules in FIG. 4, and the relevancy detection part 204 does not detect a relevancy between the two requirements.

Then, the contradiction detection part 205 refers to the requirement information storage part 201, calculates the similarity between the consequent parts after the conversion by using the prior conversion rules and before the conversion by using the contradiction rules, and compares the similarity after the conversion calculated by the relevancy detection part 204 with the similarity before the conversion by using the contradiction rules, which is calculated by the contradiction detection part 205 (Step A22). When the similarity after the conversion is equal to or more than the similarity before the conversion by using the contradiction rules, the contradiction detection part 205 controls the processing to proceed to Step A24. When the similarity after the conversion is less than the similarity before the conversion by using the contradiction rules, the contradiction detection part 205 controls the processing to proceed to Step A23.

Then, the relevancy detection part 204 increments k (Step A23). Then, the relevancy detection part 204 controls the processing to proceed to Step A17.

The contradiction detection part 205 detects the two requirements as a contradiction (Step A24). The detection result may be immediately output via a display device and a printing device, may be stored and then output depending on a request of the user of the system, or may be output in other forms. Then, the contradiction detection part 205 finishes the processing.

Figure 15:
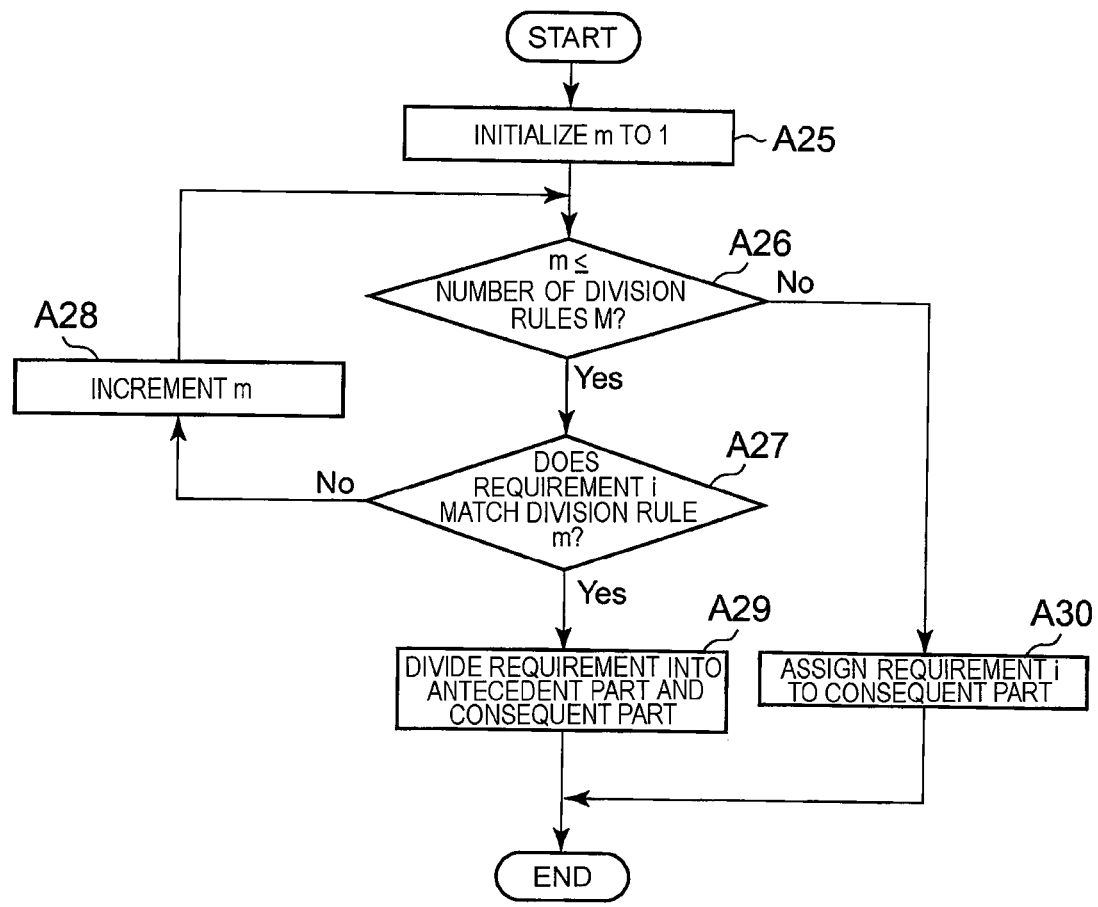
FIG. 15 is a flowchart illustrating an example of a processing sequence of a requirement division part 203 for a requirement i in the requirements contradiction detection system according to the second embodiment of this invention.

Referring to a flowchart of FIG. 15, a detailed description is now given of an operation of the requirement division part 203 for a requirement i according to the second embodiment.

First, the requirement division part 203 initializes a number m representing the division rule to 1 (Step A25).

Then, the requirement division part 203 compares m and M representing the number of the division rules with each other (Step A26). When m is equal to or less than M, the requirement division part 203 controls the processing to proceed to Step A27. When m is more than M, the requirement division part 203 controls the processing to proceed to Step A30.

Then, the requirement division part 203 verifies whether or not the requirement i matches the division pattern of the division rule m (Step A27). When the requirement i matches the division pattern, the requirement division part 203 controls the processing to proceed to Step A29. When the requirement i does not match the division pattern, the requirement division part 203 controls the processing to proceed to Step A28.

Then, the requirement division part 203 increments m representing the number of the division rule (Step A28). Then, the requirement division part 203 controls the processing to proceed to Step A26.

The requirement division part 203 uses the division rule m so as to divide the requirement into the antecedent part and the consequent part (Step A29). Then, the requirement division part 203 finishes the processing. For example, the requirement 1, "Aボタンを押下し たとき、登録した" (which means "when A button is depressed, delete registered data A."), of FIG. 9 is divided into the antecedent part, "Aボタンを押下した" (which means "A button is depressed"), and the consequent part, "登録した" (which means "delete registered data A.") of FIG. 10.

The requirement division part 203 keeps the antecedent part of the requirement i as null, and sets the consequent part to the requirement i itself (Step A30). Then, the requirement division part 203 finishes the processing.

According to this embodiment, the requirement division part divides a requirement into an antecedent part and a consequent part, and the relevancy detection part detects a contradiction between requirements similar in the antecedent part. As a result, two requirements that do not match each other in the antecedent part are not erroneously detected as being contradicting each other, and such a possibility that a contradiction is erroneously detected is reduced. Moreover, in the relevancy detection part, the requirement is converted in advance, and such a possibility that a contradiction is erroneously detected is reduced.

It should be noted that the method described herein can be stored as a program that is executable by a computer on a storage medium such as a magnetic disk such as a floppy (trademark) disk or a hard disk, an optical disc such as a CD-ROM or a DVD, a magneto-optic disk (MO), or a semiconductor memory, and can be distributed.

Moreover, as long as the storage medium can store a program, and can be read by a computer, a storage form may be any form.

Moreover, an operating system, middleware such as database management software, and network software, or the like operating on a computer may carry out a part of the respective pieces of the processing based on instructions of a program installed from the storage medium on the computer.

Further, the storage medium according to this invention is not limited to a medium independent of the computer, and includes a storage medium for storing or temporarily storing a downloaded program transmitted via a LAN, the Internet, or the like.

Moreover, the number of the storage media is not limited to one. Such a case that the processing in the above-mentioned embodiments is carried out from a plurality of media is included in the storage medium according to this invention, and a medium configuration may be any configuration.

The computer according to this invention carries out the respective processing based on programs stored in a storage medium, and may include any configuration such as an apparatus constructed by a personal computer, a system in which a plurality of apparatus are connected via a network, or the like.

Moreover, the computer according to this invention is not limited to a personal computer, includes an arithmetic processing apparatus included in an information processing apparatus, and is a device or apparatus capable of using a program to realize the functions of this invention.

It should be noted that this invention is not strictly limited to the above-mentioned embodiments, and can be embodied while the components are modified without departing from the gist thereof on an embodiment stage. Moreover, various inventions can be formed by properly combining a plurality of components. For example, some components may be removed from all the components described in the embodiments. Moreover, the components may be properly combined.

This application is based on and claims the benefit of priority from Japanese Patent Application No. 2012-275745, filed on Dec. 18, 2012, the disclosure of which is incorporated herein by reference in its entity.

Moreover, a part or an entirety of the above-mentioned embodiments can be described as follows. It should be noted that the following supplementary notes do not limit this invention in any ways.

(Supplementary Note 1)

A requirements contradiction detection system, including:

a relevancy detection part for detecting, for two requirements expressed in texts, a relevancy between the two requirements based on a similarity between one requirement acquired by converting one of the texts based on a predetermined contradiction rule and another requirement that is not converted; and a contradiction detection part for detecting whether or not the two requirements contradict each other based on a detection result of the relevancy detection part, the similarity calculated by the relevancy detection part, and a similarity between the two original requirements before conversion.

(Supplementary Note 2)

A requirements contradiction detection system according to Supplementary Note 1, in which:

the predetermined contradiction rule includes a plurality of contradiction expressions representing a plurality of states that are not simultaneously satisfied; and the conversion of the requirement by the relevancy detection part is a conversion of, in the one requirement, a string matching one contradiction expression of the predetermined contradiction rule into a string matching another contradiction expression of the predetermined contradiction rule.

(Supplementary Note 3)

A requirements contradiction detection system according to Supplementary Note 1 or 2, in which:

the relevancy detection part detects that, when the similarity calculated by the relevancy detection part is equal to or more than a predetermined threshold, the relevancy exists between the two requirements; and the contradiction detection part detects the contradiction when the relevancy detection part detects that the relevancy exists and when the similarity calculated by the relevancy detection part is higher than the similarity between the two original requirements before the conversion.

(Supplementary Note 4)

A requirements contradiction detection system according to any one of Supplementary Notes 1 to 3, in which the relevancy detection part and the contradiction detection part calculate the similarity between the two texts based on an approximation of Kolmogorov complexity.

(Supplementary Note 5)

A requirements contradiction detection system according to any one of Supplementary Notes 1 to 4, in which the relevancy detection part and the contradiction detection part convert, before the similarity is calculated, the two requirements based on one contradiction rule used for the conversion in the relevancy detection part and a predetermined prior conversion rule.

(Supplementary Note 6)

A requirements contradiction detection system according to Supplementary Note 5, in which, provided that a string matching one contradiction expression of the one contradiction rule used for the conversion in the one requirement to be converted in the relevancy detection part is referred to as a conversion string, the predetermined prior conversion rule converts the two requirements by using a string other than the conversion string out of strings matching the predetermined prior conversion rule.

(Supplementary Note 7)

A requirements contradiction detection system according to any one of Supplementary Notes 1 to 6, further including a requirement division part for dividing a requirement expressed in a text into an antecedent part and a consequent part based on a predetermined division rule, in which: the relevancy detection part detects the relevancy between the two requirements based on a similarity between texts of the antecedent parts of the two requirements, and a similarity between texts of the consequent parts of one requirement acquired by converting one of the texts based on a predetermined contradiction rule and another requirement that is not converted; and the contradiction detection part detects which requirements contradict each other based on the detection result of the relevancy detection part, the similarity between the texts of the consequent parts calculated by the relevancy detection part, and a similarity between the texts of the consequent parts of the two original requirements before the conversion.

(Supplementary Note 8)

A requirements contradiction detection method, including detecting, for two requirements expressed in texts, a relevancy between the two requirements based on a similarity between a requirement acquired by converting one of the texts based on a predetermined contradiction rule and another requirement that is not converted; and detecting whether or not the two requirements contradict each other based on a detection result of the detecting the relevancy, the similarity calculated by the detecting the relevancy, and a similarity between the two original requirements before conversion.

(Supplementary Note 9)

A requirements contradiction detection method according to Supplementary Note 8, in which: the predetermined contradiction rule includes a plurality of contradiction expressions representing a plurality of states that are not simultaneously satisfied; a the conversion of the requirement by the relevancy detection part is a conversion of, in the one requirement, a string matching one contradiction expression of the predetermined contradiction rule into a string matching another contradiction expression of the predetermined contradiction rule.

(Supplementary Note 10)

A requirements contradiction detection method according to Supplementary Note 8 or 9, in which: the detecting of the relevancy includes detecting that when the similarity calculated by the detecting the relevancy is equal to or more than a predetermined threshold, the relevancy exists between the two requirements; and the detecting of the contradiction includes detecting the contradiction when the detecting the relevancy detects that the relevancy exists and when the similarity calculated by the detecting the relevancy is higher than the similarity between the two original requirements before the conversion.

(Supplementary Note 11)

A requirements contradiction detection method according to any one of Supplementary Notes 8 to 10, in which the detecting of the relevancy and the detecting of the contradiction include calculating the similarity between the two texts based on an approximation of Kolmogorov complexity.

(Supplementary Note 12)

A requirements contradiction detection method according to any one of Supplementary Notes 8 to 11, in which the detecting of the relevancy and the detecting of the contradiction include converting, before the similarity is calculated, the two requirements based on one contradiction rule used for the conversion in the detecting the relevancy and a predetermined prior conversion rule.

(Supplementary Note 13)

A requirements contradiction detection method according to Supplementary Note 12, in which, provided that a string matching one contradiction expression of the one contradiction rule used for the conversion in the one requirement to be converted in the detecting the relevancy is referred to as a conversion string, the predetermined prior conversion rule converts the two requirements by using a string other than the conversion string out of strings matching the predetermined prior conversion rule.

(Supplementary Note 14)

A requirements contradiction detection method according to any one of Supplementary Notes 8 to 13, in which dividing a requirement expressed in a text into an antecedent step part and a consequent step part based on a predetermined division rule:

the detecting of the relevancy includes detecting the relevancy between the two requirements based on a similarity between texts of the antecedent parts of the two requirements, and a similarity between texts of the consequent parts of the two requirements; and the detecting of the contradiction includes detecting whether or not the two requirements contradict each other based on the detection result of the detecting the relevancy, the similarity between the texts of the consequent parts calculated by the detecting the relevancy, and a similarity between the texts of the consequent parts of the two original requirements before the conversion.

(Supplementary Note 15)

A requirements contradiction detection program, including: relevancy detection processing of detecting, for two requirements expressed in texts, a relevancy between the two requirements based on a similarity between one requirement acquired by converting one of the texts based on a predetermined contradiction rule and another requirement that is not converted; and contradiction detection processing of detecting whether or not the two requirements contradict each other based on a detection result of the relevancy detection processing, the similarity calculated by the relevancy detection processing, and a similarity between the two original requirements before conversion.

(Supplementary Note 16)

A requirements contradiction detection system according to Supplementary Note 15, in which: the predetermined contradiction rule includes a plurality of contradiction expressions representing a plurality of states that are not simultaneously satisfied; and the conversion of the requirement by the relevancy detection part is a conversion of, in the one requirement, a string matching one contradiction expression of the predetermined contradiction rule into a string matching another contradiction expression of the predetermined contradiction rule.

(Supplementary Note 17)

A requirements contradiction detection system according to Supplementary Note 15 or 16, in which: the relevancy detection processing detects that, when the similarity calculated by the relevancy detection processing is equal to or more than a predetermined threshold, the relevancy exists between the two requirements; and the contradiction detection processing detects the contradiction when the relevancy detection processing detects that the relevancy exists and when the similarity calculated by the relevancy detection processing is higher than the similarity between the two original requirements before the conversion.

(Supplementary Note 18)

A requirements contradiction detection program according to any one of Supplementary Notes 15 to 17, in which the relevancy detection processing and the contradiction detection processing calculate the similarity between the two texts based on an approximation of Kolmogorov complexity.

(Supplementary Note 19)

A requirements contradiction detection program according to any one of Supplementary Notes 15 to 18, in which the relevancy detection processing and the contradiction detection processing convert, before the similarity is calculated, the two requirements based on one contradiction rule used for the conversion in the relevancy detection part processing and a predetermined prior conversion rule.

(Supplementary Note 20)

A requirements contradiction detection program according to Supplementary Note 19, in which, provided that a string matching one contradiction expression of the one contradiction rule used for the conversion in the one requirement to be converted in the relevancy detection processing is referred to as a conversion string, the predetermined prior conversion rule converts the two requirements by using a string other than the conversion string out of strings matching the predetermined prior conversion rule.

(Supplementary Note 21)

A requirements contradiction detection program according to any one of Supplementary Notes 15 to 20, further including a requirement division processing for dividing a requirement expressed in a text into antecedent processing and consequent processing based on a predetermined division rule, in which: the relevancy detection processing detects the relevancy between the two requirements based on a similarity between texts of the antecedent parts of the two requirements, and a similarity between texts of the consequent parts of the two requirements; and the contradiction detection processing detects whether or not the two requirements contradict each other based on the detection result of the relevancy detection processing, the similarity between the texts of the consequent parts calculated by the relevancy detection processing, and a similarity between the texts of the consequent parts of the two original requirements before the conversion.

REFERENCE SIGNS LIST 11 storage part
12 calculation part
21 storage part
22 calculation part
100 requirement storage part
101 contradiction rule storage part
102 relevancy detection part
103 contradiction detection part
200 division rule storage part
201 requirement information storage part
202 prior conversion rule storage part
203 requirement division part
204 relevancy detection part
205 contradiction detection part This application is based on and claims priority from Japanese Patent Application No. 2012-275745, filed on Dec. 18, 2012, the entire disclosure of which is incorporated herein.

What is claimed is:

1. A requirements contradiction detection system, comprising:
   a computer having an arithmetic processing apparatus and semiconductor memory;
   a requirement division part that divides requirements expressed in texts into antecedent parts and consequent parts based on a predetermined division rule,
   a relevancy detection part detects, for two requirements expressed in texts, a relevancy between the two requirements based on a similarity between texts of the antecedent parts of the two requirements, and a similarity between texts of the consequent parts of one requirement acquired by converting one of the texts based on a predetermined contradiction rule comprising a plurality of contradiction expressions and another requirement that is not converted;
   the conversion based on the predetermined contradiction rule and the conversion of the requirement by the relevancy detection part comprises a conversion of, in the one requirement, a string matching one contradiction expression of the predetermined contradiction rule into a string matching another contradiction expression of the predetermined contradiction rule; and
   a contradiction detection part detecting whether or not the two requirements contradict each other based on the detection result of the relevancy detection part, the similarity between the texts of the consequent parts calculated by the relevancy detection part, and a similarity between the texts of the consequent parts of the two original requirements before conversion.

2. A requirements contradiction detection system according to claim 1, wherein:
the predetermined contradiction rule comprises a plurality of contradiction expressions representing a plurality of states that are not simultaneously satisfied.

3. A requirements contradiction detection system according to claim 1, wherein:
the relevancy detection part detects that, when the similarity calculated by the relevancy detection part is equal to or more than a predetermined threshold, the relevancy exists between the two requirements; and
the contradiction detection part detects the contradiction when the relevancy detection part detects that the relevancy exists and when the similarity calculated by the relevancy detection part is higher than the similarity between the two original requirements before the conversion.

4. A requirements contradiction detection system according to claim 1, wherein the relevancy detection part and the contradiction detection part calculate the similarity between the two texts based on an approximation of Kolmogorov complexity.

5. A requirements contradiction detection system according to claim 1, wherein the relevancy detection part and the contradiction detection part convert, before the similarity is calculated, the two requirements based on one contradiction rule used for the conversion in the relevancy detection part and a predetermined prior conversion rule.

6. A requirements contradiction detection system according to claim 5, wherein, provided that a string matching one contradiction expression of the one contradiction rule used for the conversion of the one requirement to be converted in the relevancy detection part is referred to as a conversion string, the predetermined prior conversion rule converts the two requirements by using a string other than the conversion string out of strings matching the predetermined prior conversion rule.

7. A requirements contradiction detection method performed by a computer, comprising:
dividing requirements expressed in texts into antecedent parts and consequent parts based on a predetermined division rule,
detecting, for two requirements expressed in texts, a relevancy between the two requirements based on a similarity between texts of the antecedent parts of the two requirements, and a similarity between texts of the consequent parts of one requirement acquired by converting one of the texts based on a predetermined contradiction rule comprising a plurality of contradiction expressions and another requirement that is not converted;
the conversion based on the predetermined contradiction rule and the conversion of the requirement by the relevancy detection comprises a conversion of, in the one requirement, a string matching one contradiction expression of the predetermined contradiction rule into a string matching another contradiction expression of the predetermined contradiction rule; and
detecting whether or not the two requirements contradict each other based on the detection result of the relevancy detection, the similarity between the texts of the consequent parts calculated by the relevancy detection, and a similarity between the texts of the consequent parts of the two original requirements before conversion.

8. A non-transitory storage medium storing a requirements contradiction detection program for that when executed on a computer performs the steps of:
dividing requirements expressed in texts into antecedent parts and consequent parts based on a predetermined division rule,
detecting, for two requirements expressed in texts, a relevancy between the two requirements based on a similarity between texts of the antecedent parts of the two requirements, and a similarity between texts of the consequent parts of one requirement acquired by converting one of the texts based on a predetermined contradiction rule comprising a plurality of contradiction expressions and another requirement that is not converted;
the conversion based on the predetermined contradiction rule and the conversion of the requirement by the relevancy detection comprises a conversion of, in the one requirement, a string matching one contradiction expression of the predetermined contradiction rule into a string matching another contradiction expression of the predetermined contradiction rule; and
detecting whether or not the two requirements contradict each other based on the detection result of the relevancy detection, the similarity between the texts of the consequent parts calculated by the relevancy detection part, and a similarity between the texts of the consequent parts of the two original requirements before conversion.

* * * * *